United States Patent [19]
Papadopoulos et al.

[11] 3,745,265
[45] July 10, 1973

[54] DISC FILE HUB MOUNTING MEANS

[75] Inventors: Stelios B. Papadopoulos, Westlake Village; Frank Kupka, Thousand Oaks, both of Calif.

[73] Assignee: Sperry Rand Corporation, New York, N.Y.

[22] Filed: Dec. 14, 1970

[21] Appl. No.: 97,912

[52] U.S. Cl. .......... 179/100.2 A, 274/10 S, 346/137
[51] Int. Cl. .......... G11b 25/04
[58] Field of Search .......... 340/174.1 C; 346/74 MD, 137; 274/10 S; 248/130

[56] References Cited

UNITED STATES PATENTS

| | | | |
|---|---|---|---|
| 3,587,073 | 6/1971 | Ghose | 340/174.1 C |
| 2,838,315 | 6/1958 | Staar | 240/10 S |
| 3,176,309 | 3/1965 | Chatelain | 346/137 |
| 3,548,394 | 12/1970 | Felts | 340/174.1 C |

*Primary Examiner*—Vincent P. Canney
*Attorney*—Charles C. English, Sheldon Kapustin and William E. Cleaver

[57] ABSTRACT

A hub assembly useful in a magnetic disc storage unit for supporting a plurality of discs. The assembly includes a horizontally supported hub internally engaged with a concentric drive spindle. The hub outer circumference is provided with two land areas spaced by 120°. The radial distance from the hub axis to each land area outer surface is selected to be equal to the inner disc radius. The remainder of the hub outer circumference is relieved to permit the discs to be easily installed on and removed from the hub. A mechanism is provided to selectively lock the hub in a position at which the two land areas are equally displaced by 60° from the vertical plane through the hub axis. By putting the discs on the hub when the hub is in the locked position, gravity will locate the disc inner surface on the land areas, and align the disc and hub central axes. The discs are locked relative to the hub by an end plate mounted on the free end of the hub which bears along the hub axis against the discs.

6 Claims, 3 Drawing Figures

Patented July 10, 1973 3,745,265

3 Sheets-Sheet 1

INVENTORS
STELIOS B. PAPADOPOULOS
FRANK KUPKA
BY
Lindenberg, Freilich & Wasserman
ATTORNEYS Patented July 10, 1973

3,745,265

3 Sheets-Sheet 2

INVENTORS
STELIOS B. PAPADOPOULOS
FRANK KUPKA
BY
Lindenberg, Freilich & Wasserman
ATTORNEYS Patented July 10, 1973 3,745,265

3 Sheets-Sheet 3

INVENTORS
STELIOS B. PAPADOPOULOS
FRANK KUPKA
BY
Lindenberg, Freilich & Wasserman
ATTORNEYS

DISC FILE HUB MOUNTING MEANS

BACKGROUND OF THE INVENTION

1. Field of the Invention

This invention relates generally to magnetic disc storage units and, more particularly, to a hub assembly which enables discs to be easily installed on and removed from a rotatable hub.

2. Description of the Prior Art

In designing high density high speed disc storage units of the type employed in data processing systems, it is often important to incorporate the capability of being able to install and remove discs with relative ease. Moreover, since the discs normally rotate at high speeds (e.g., 1800 rpm) and may be large and heavy, it is also essential to assure proper mounting of the discs on the rotatable hub to avoid dynamic unbalance.

SUMMARY OF THE INVENTION

The present invention is directed to a hub assembly useful in a disc storage unit which assures balanced mounting of the discs on a hub and yet which permits the discs to be easily installed on and removed from the hub.

In order to achieve dynamic balance, it is important that the disc axis coincide with the hub axis. In accordance with a significant feature of the invention, in order to assure this coincidence, the other hub surface is provided with a pair of land areas displaced by 120°. The outer surfaces of the land areas are spaced from the hub axis by a radial distance equal to the inner disc radius. The remainder of the hub outer surface is relieved to provide clearance and facilitate installation and removal of the discs.

In accordance with another aspect of the invention, a locking mechanism is provided to selectively lock the hub so that the two land areas are positioned above the hub axis equally spaced by 60° from the vertical plane through the hub axis. In this locked position, the discs can be placed on the hub with gravity acting to center the discs on the land areas, and thus locate the disc axis coincident with the hub axis.

The novel features of the invention are set forth with particularity in the appended claims. The invention will be best understood from the following description when read in conjunction with the accompanying drawing.

DESCRIPTION OF THE PREFERRED EMBODIMENTS

Figure 1:
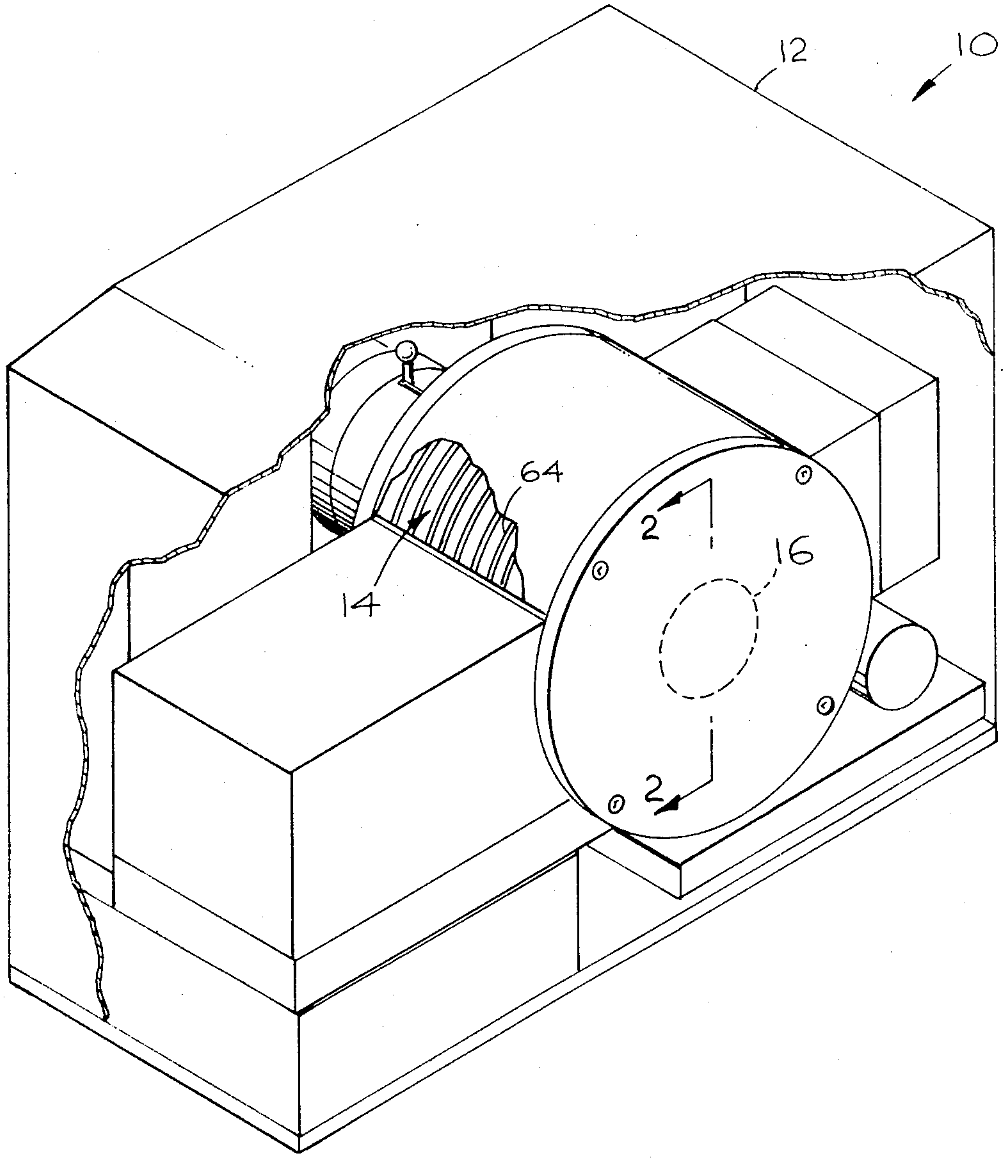
FIG. 1 is a perspective view of a magnetic disc storage unit which can advantageously employ the teachings of the present invention.

Attention is now called to FIG. 1 of the drawing which illustrates a typical magnetic disc storage unit 10 which can advantageously employ the teachings of the present invention. Briefly, the storage unit 10 is comprised of a housing 12 within which a magnetic disc compartment 14 is defined. A cylindrical hub is supported within the compartment 14 for rotation about its axis. A plurality of spaced magnetic discs extending in planes perpendicular to the hub axis are removably secured to the hub for rotation therewith. In accordance with the present invention, the hub axis is mounted horizontally and the hub is configured in a manner to assure precise balanced mounting of the discs on the hub while still permitting the discs to be relatively easily installed on and removed from the hub.

Figure 2:
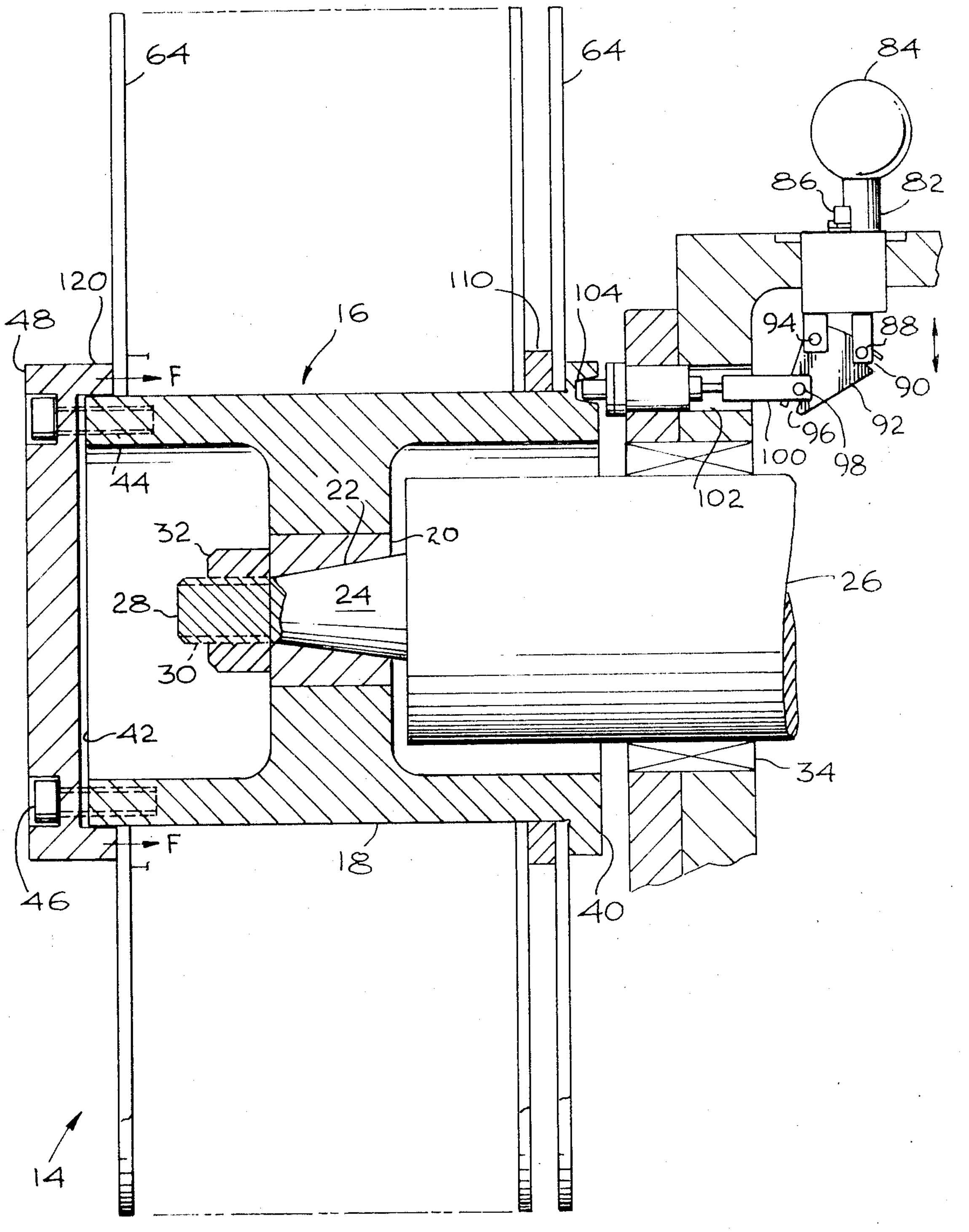
FIG. 2 is a sectional view taken substantially along the vertical plane 2—2 of FIG. 1.
Figure 3:
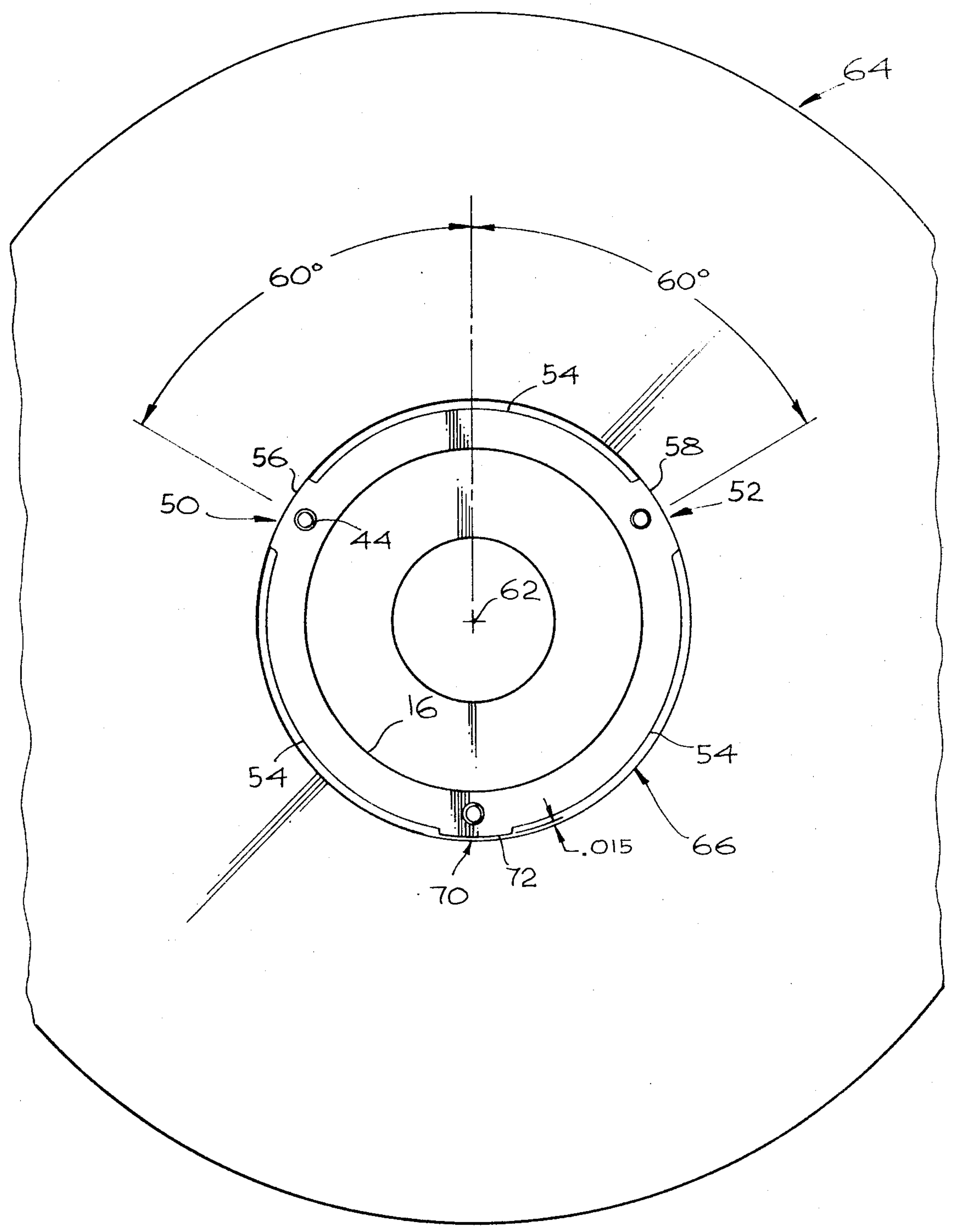
FIG. 3 is a front view of the hub illustrating the raised areas on the circumference thereof.

More particularly, in accordance with the present invention, a hub assembly 16, as shown in FIGS. 2 and 3, is provided which includes a cylindrical hub 18. The hub 18 preferably comprises a hollow aluminum casting having a hard steel cone member 20 press fit therein. The member 20 is provided with a tapered central opening 22 adapted to receive the conical end 24 of a spindle 26. The free end 28 of the spindle is provided with external threads 30 for receiving a nut 32 for tightly securing the member 20, and thus the hub 18, to the spindle 26. The spindle 26 is journaled in a bearing assembly 34 and coupled to a drive motor (not shown) for rotation about its central axis.

The hub 18 has a first end plate 40 formed integral therewith. The outer face 42 of the hub is provided with internally threaded openings 44 for receiving bolts 46 for securing an end plate 48 thereto.

The outer circumferential surface of the hub is best illustrated in FIG. 3 and includes first and second land areas 50 and 52 raised above the adjacent hub circumferential surface 54. The outer surfaces 56 and 58 of the land areas 50 and 52 respectively are radially spaced from the hub axis 62 by a distance equal to the inner radius of a disc 64. More particularly, each of the discs 64 is provided with a central circular opening 66 having a precisely machined radius. In a typical embodiment of the invention, the disc outer diameter is 24 inches and the disc inner diameter is 7.00 inches, i.e., an inner radius equal to 3.50 inches. For reasons which will become more apparent hereinafter, the radial distance from the hub axis 62 to the land area surfaces 56 and 58 is also made equal to 3.50 inches.

In addition to the first and second raised land areas 50 and 52, a third raised area 70 is provided. The outer surface 72 of the raised area 70 is spaced more closely to the hub axis 62 than the surfaces 56 and 58 to provide greater clearance to the disc to facilitate the installation and removal of the disc relative to the hub. For example, the radial distance from the hub axis 62 to the surface 72 may be 0.15 inches less than the radial spacing to the surfaces 56 and 58.

The radial center lines from the hub axis 62 to the raised areas 50, 52 and 70 are displaced from one another by substantially 120°.

In order to properly mount the discs 64 on the hub 16, it is important that the disc axes coincide with the hub axis to assure dynamic balance. In accordance with the present invention, disc and hub axis coincidence is achieved by installing the discs on the hub while the hub is locked in the position illustrated in FIG. 3; i.e., with the land areas 50 and 52 each displaced by 60° in opposite directions from the vertical plane through tthe hub axis. With the hub locked in this position, the discs are axially threaded onto the hub. The reduced radius of the raised area 70 surface 72 provides sufficient clearance to enable the discs to be easily slipped onto the hub.

With the hub oriented horizontally as previously mentioned, gravity will act on the discs 64 to engage the land area surfaces 56 and 58 against the inner radius of the disc. Since the disc inner radius and the radius of the land area surfaces 56 and 58 are substantially identical, the disc axis will coincide with the hub axis with the disc and hub being engaged only along the two land area surfaces. The arcuate length of the land area surfaces 56 and 58 is not critical but it is desirable to minimize this length in order to reduce the amount of precision machining required. That is, the land area surfaces must be precisely machined to achieve the required curvature.

In order to enable the hub 16 to be locked into the position illustrated in FIG. 3 with the two land areas 50 and 52 being displaced by 60° in opposite directions from the vertical plane through the hub axis, a locking mechanism (FIG. 2) conveniently accessible to an operator is provided. The locking mechanism includes a rod 82 mounted for linear movement and having a handle 84 easily accessible to the operator. The rod 82 can be latched by spring detent means 86 in either a raised unlocked position or the lowered locked position illustrated in FIG. 2. The lower end of the rod 82 is provided with a pin 88 fitted in a notch 90 of a rocker plate 92 mounted for pivotal movement about a fixed pin 94. A notch 96 in the rocker plate receives a pin 98 terminally secured to a piston member 100. FIG. 2 illustrates the rod 82 in the lowered locked position in which the rocker plate 92 is pivoted clockwise about fixed pin 94 to project the piston 100 to the left as illustrated in FIG. 2. When the rod 82 is pulled to its raised unlocked position, the rocker plate 92 rotates in a counter clockwise direction about fixed pin 94 to withdraw the piston member 100 to the right.

The piston member is mounted for linear movement within a passageway 102 opposite to a cavity 104 formed in the hub end plate 40. The passageway 102 and piston 100 are mounted in the vertical plane through the spindle 26. The cavity 104 is formed in the end plate 40 intermediate the two spaced land areas 50 and 52. Thus, by rotating the hub 16 to align the cavity 104 with the piston member 100 and by then lowering the rod 82 to project the piston member 100 into the cavity 104, the hub 16 can be locked in the position illustrated in FIG. 3. As previously pointed out, in the locked position of FIG. 3, discs can be threaded onto the hub with gravity acting on the discs to locate the discs on the land area surfaces so as to bring the disc and hub axes into coincidence.

In order to install a plurality of discs on the hub, the hub is initially locked, in accordance with the foregoing explanation into the locked position of FIG. 3. The discs 64 are then successively threaded onto the hub with spacers 110 (FIG. 2) being inserted between adjacent discs. After all the discs and spacers have been threaded onto the hub, the end plate 48 is secured to the hub by the previously mentioned bolts 46 engaged in threaded openings 44. It is to be noted that the end plate 48 is provided with an axially projecting flange portion 120 adapted to engage the outermost disc (or spacer) to provide an axial force extending parallel to the hub axis toward the hub end plate 40. The magnitude of this axial force is, of course, determined by how far down the bolts 46 are tightened in the threaded openings 44. It is of course important that the force be of sufficient magnitude to lock the discs relative to the hub so as to thereby prevent any relative rotary motion therebetween.

From the foregoing it should be recognized that an improved hub assembly has been disclosed herein which is particularly useful in magnetic disc storage units for properly locating discs on a hub. Use of the present invention permits easy installation and removal of discs from a hub while assuring disc and hub axis coincidence to avoid any dynamic unbalance.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. In a magnetic disc storage unit, a hub assembly for supporting a plurality of magnetic discs each having a central circular opening, said hub assembly comprising:

a cylindrical hub having a circumferential outer surface;

first and second raised land areas formed on said hub outer surface displaced equidistantly in opposite directions from a vertical plane through the axis of said hub, said land areas each having surfaces spaced from the axis of said hub by a radial distance equal to the radius of said disc central openings;

means supporting said hub for rotation about a horizontally oriented axis; and means for selectively locking said hub into a position at which said first and second land areas lie above a horizontal plane through said hub axis and are respectively displaced by the same angle in opposite directions from said vertical plane through said hub axis.

2. The assembly of claim 1 wherein said hub has a free end thus permitting said discs to be slid onto said hub along the axis thereof, said discs being free to bear downwardly against said hub land areas to thus locate said disc areas coincident with said hub axis;

a plurality of spacer collars each adapted to be fitted around said hub between adjacent discs; and an end plate adapted to be secured to said hub free end for bearing against said discs and collars in the direction of said hub axis.

3. The assembly of claim 1 further including a third raised land area on said hub outer surface displaced between said first and second raised area, said third land area having its surface spaced from the axis of said hub by a radial distance which is less than the radius of said disc central openings.

4. A hub assembly useful in a magnetic disc storage unit for precisely locating discs relative to a hub and for allowing easy installation on and removal of the discs from said hub, said assembly comprising:

a cylindrical hub having an outer surface relieved along a substantial portion of the circumference thereof to define first and second land areas displaced by 120° around said circumference, each of said land areas defining a reference surface spaced by a radial distance from the axis of said hub equal to the radius of a central disc opening;

means supporting said hub with its axis oriented horizontally and for rotation thereabout;

means for locking said hub in a locked position whereat said first and second land areas are disposed above a horizontal plane through said hub axis and displaced equally by 60° in opposite directions from a vertical plane through said hub axis;

a plurality of discs each having a central opening having a radius equal to said radial distance between said hub axis and said reference surfaces, said discs adapted to be threaded on said hub while in said locked position so as to be free to bear downwardly equally against said reference surfaces to thus locate said disc axes coincident with said hub axis; and means for locking said discs to said hub while said hub is in said locked position.

5. The hub assembly of claim 4 wherein a third raised area is formed on the outer surface of said hub, displaced by 120° from each of said first and second land areas, said third area having a surface spaced from said hub axis by a radial distance less than said radial distance between said hub axis and said reference surfaces.

6. The assembly of claim 4 including a cavity centrally defined in said hub; and a drive spindle projecting into said cavity and fixedly secured to said hub therein.

* * * * *